3,484,157
ABRASION-RESISTANT OPTICAL ELEMENT
Harry D. Crandon, Woodstock, Conn., and Ronald B. Greenberg, Worcester, Mass., assignors, by mesne assignments, to American Optical Corporation, a corporation of Delaware
Filed Oct. 23, 1965, Ser. No. 503,483
Int. Cl. G02c 7/02; G02b 3/00
U.S. Cl. 351—166
10 Claims

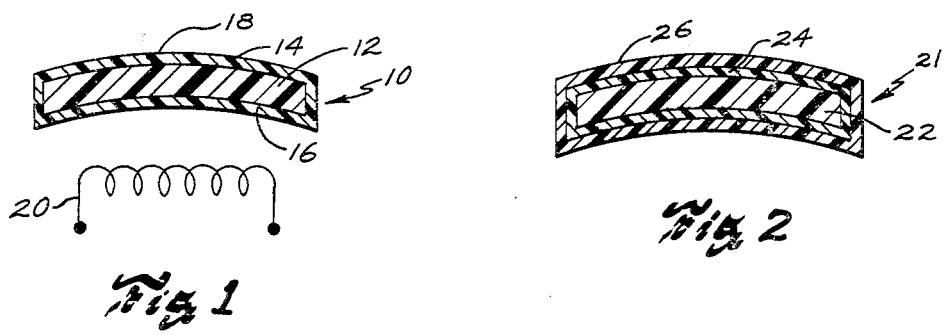
Fig. 1
Fig. 2
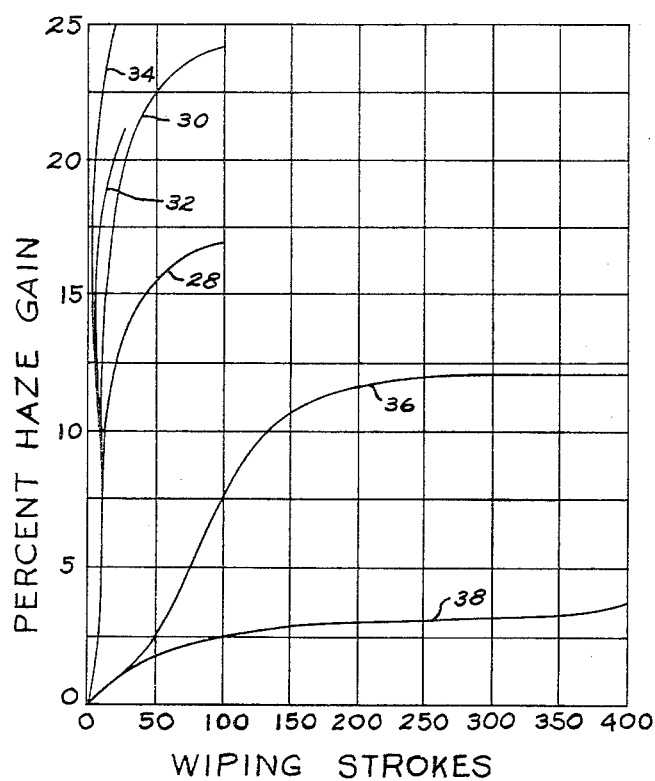
Fig. 3
INVENTOR.
HARRY D. CRANDON
RONALD B. GREENBERG
BY James P. McAndrews
ATTORNEY United States Patent Office 3,484,157
Patented Dec. 16, 1969

ABSTRACT OF THE DISCLOSURE

An abrasion-resistant plastic transparent optical element is provided. The element is comprised of a transparent base of organic material having a directly adhering coating comprised of a vinyl polymer cross-linked with a dialdehyde cross-linking agent.

---

The field of this invention is that of abrasion-resistant optical elements and the invention relates more particularly to novel and improved lens elements of organic plastic materials having directly adhering, transparent, abrasion-resistant coatings and to novel and improved methods of making such coated elements.

Organic plastic materials display many useful optical properties and have been used for many years in forming a variety of different optical elements. Such materials have proven particularly useful for making ophthalmic lenses and the like in that lenses formed from such materials are very light in weight, are impact-resistant, are inexpensive and can be conveniently molded with any desired surface curvatures, including aspheric surface curvatures. However, lenses formed of organic lens materials are characterized by poor abrasion resistance. Even lenses formed of allyl diglycol carbonate, the best available organic lens material, have generally exhibited relatively lower abrasion resistance than would be desired. As a result such lenses become scratched in use, thereby reducing the useful life of the lenses.

It is an object of this invention to provide novel and improved organic optical elements having directly adhering, transparent, abrasion-resistant surface coatings; to provide such coated optical elements which display abrasion-resistance substantially greater than has been achieved in previously known coated optical elements of organic materials; and to provide such coated lens elements which can be formed with any desired surface curvatures. It is an additional object of this invention to provide novel and improved methods for making such coated optical elements.

How the objects of this invention are achieved, as well as other objects, advantages and details of this invention, appears in the following detailed description of preferred embodiments of this invention, the description referring to the drawing in which:

FIG. 1 is a section view along the center of a preferred embodiment of the abrasion-resistant coated lens provided by this invention;

FIG. 2 is a view similar to FIG. 1 relating to an alternative embodiment of this invention; and FIG. 3 is a graph illustrating the abrasion-resistance of a coated lens provided by this invention as compared to the abrasion-resistance of prior art lenses formed of organic materials.

The abrasion-resistant optical element of this invention includes a transparent base element formed of conventional organic optical materials in conventional manner. For example, a preferred embodiment of this invention indicated at 10 in FIG. 1 incorporates a base lens element 12 cast in the manner described in U.S. Patent No. 3,136,000 issued June 9, 1964 to C. M. Slyk. Of course, any other conventional process for forming organic lens elements and the like by injection molding, thermoforming, casting or the like can also be used within the scope of this invention. It should be understood that although lens elements are described herein, the base optical elements could also comprise sheet materials, windows or the like within the scope of this invention.

The organic material from which the lens element is formed preferably comprises allyl diglycol carbonate to provide a transparent base lens element 12 of good optical properties having lens surfaces 14 and 16 of any selected curvature. However practical embodiments of this invention have employed base lens elements of other organic optical materials such as cellulose acetate, cellulose acetate-butyrate, and cellulose propionate as well as copolymers of allyl diglycol carbonate with other monomers such as vinyl acetate, methyl methacrylate, triallyl cyanurate and maleic anhydride. Other practical embodiments of this invention have employed base optical elements formed of polycarbonate, methyl methacrylate or copolymers of methyl methacrylate.

In accordance with this invention, the selected base optical element is provided with a directly adhering, transparent abrasion-resistant surface coating embodying a vinyl polymer cross-linked with a dialdehyde agent. The preferred vinyl polymer is selected from the group consisting of partially or wholly hydrolyzed vinyl acetate polymers and polyvinyl butyral polymers, particularly including hydrolyzed water-soluble polyvinyl butyral polymers.

For example, in the preferred embodiment of this invention where the base lens element is formed of allyl diglycol carbonate, cellulose acetate, cellulose acetate-butyrate, cellulose propionate or a copolymers of allyl diglycol carbonate with another monomer such as vinyl acetate, methyl methacrylate, triallyl cyanurate or maleic anhydride, a coating solution is prepared comprising an aqueous solution of polyvinyl alcohol and glyoxal, a dialdehyde cross-linking agent. The polyvinyl alcohol is preferably prepared in the form of an aqueous solution in concentration of 10 weight percent and is combined with a stoichiometric amount of glyoxal capable of reacting fully with the hydroxyl content of the selected polymer. The glyoxal is preferably added in the form of an aqueous solution in concentration of 40 weight percent. The selected base lens element 12 is then coated with this combined solution in any conventional manner. Preferably the lens element is dipped in the combined solution to form the uniform coating 18 shown in FIG. 1. As the coating is applied as a solution, uniform coating of any base lens element surface is easily accomplished regardless of surface curvature as will be understood. As is diagrammatically illustrated by the heating coil 20 in FIG. 1, the coated lens element 10 is then heated for drying the coating. During this heating the vinyl polymer and dialdehyde cross-linking agent combine in a condensation process to form a directly-adhering, transparent, thermoset, abrasion-resistant coating on the lens element. It is believed that a ladder-type of cross-linking occurs in which adjacent molecular chains of the polymer are cross-linked at regular intervals along the molecular chains. Where the lens element is formed of allyl diglycol carbonate and the coating solution comprises polyvinyl alcohol with glyoxal as a cross-linking agent, the coated element is preferably heated at a temperature up to 115° C. for a period of from 1 to 2 hours to form the desired abrasion-resistant coating. Similar heating cycles can be employed for drying other coated lens elements provided by this invention as will be recognized by persons skilled in the plastic lens art.

In alternative embodiments of this invention where the base optical element is formed of any of the previously named organic optical materials, a coating solution is prepared by combining an aqueous solution of a hydrolyzed, water-soluble polyvinyl butyral polymer with glyoxal as the cross-linking agent. The selected base lens element is then coated with this solution and is heated for drying the coating in the manner previously described, thereby to provide the lens element with the desired directly-adhering, abrasion-resistant, transparent coating. A particularly desirable abrasion-resistant lens element provided by this invention incorporates a base lens element formed of polycarbonate having a directly-adhering, transparent, abrasion-resistant surface coating embodying hydrolyzed, water-soluble polyvinyl butyral cross-linked with a dialdehyde cross-linking agent.

In other alternative embodiments of this invention where the base optical element is formed of any of the previously named organic optical materials, a coating solution is prepared by combining an alcohol solution of polyvinyl butyral with glyoxal as the cross-linking agent. The glyoxal is preferably dissolved in water before being added to the polyvinyl butyral solution. When the selected base lens element is coated with this solution and heated in the manner previously described, this lens element is also provided with the desired, directly-adhering, abrasion-resistant, transparent coating.

In other alternative embodiments of this invention, base optical elements are formed of polycarbonate, methyl methacrylate or copolymers of methyl methacrylate and are subcoated with polyvinyl butyral in a conventional manner. For example, in the embodiment of the invention indicated at 21 in FIG. 2, a base lens element 22 is provided with a polyvinyl butyral subcoat 24 by any conventional means. This is conveniently accomplished in well-known manner by dipping the polycarbonate element in an ethanol solution of polyvinyl butyral of 10 weight percent concentration and by air-drying the resultant subcoated element. This subcoated element is then coated, as by dipping, with the coating solution previously described as embodying polyvinyl alcohol and glyoxal. This element is then heated for forming the desired abrasion-resistant coating 26.

In other alternative embodiments of this invention, pyruvic aldehyde, 2-hydroxyadipaldehyde or glutaraldehyde is substituted on a molar basis for glyoxal in the coating solutions previously described.

The coated optical elements of this invention display greatly improved abrasion resistance. For example, lens elements formed of allyl diglycol carbonate, methyl methacrylate, a copolymer of styrene and methyl methacrylate, polycarbonate, and cellulose acetate respectively were subjected to the well-known wipe test. A coated lens element comprising an allyl diglycol base lens element having a coating embodying polyvinyl alcohol and glyoxal according to this invention was then subjected to the same test. In this test, a felt pad impregnated with Carborundum abrasive particles is mechanically wiped across the surface of the optical element being tested with an applied force of 200 grams per square inch. Prior to testing, and after each 50 wiping strokes, the light-scattering properties of the wiped section of the lens is tested with a Hazemeter according to the Standard Test D1003–52 prescribed by the American Society for Testing Materials. The optical elements formed of methyl methacrylate, the copolymer of styrene and methyl methacrylate, polycarbonate, and cellulose acetate showed a marked increase in light-scattering, thereby indicating substantial abrasion, after 50 wiping strokes or less as shown by curves 28, 30, 32 and 34 respectively in FIG. 3. The lens element formed of allyl diglycol carbonate showed better abrasion resistance as indicated by curve 36 in FIG. 3. However, this lens still showed a 12 percent increase in light-scattering or haze after 200 wiping strokes. The abrasion-resistant lens element of this invention showed less than 4 percent increase in light-scattering or haze after 400 wiping strokes as indicated by curve 38 in FIG. 3. The lens elements of this invention showed similar improved abrasion-resistance when subjected to Standard Abrasion Tests D673–44 and D1244–56 prescribed by the American Society for Testing Materials. These tests illustrate the great superiority of optical elements of this invention with respect to abrasion-resistance over the best organic lenses previously known in the art.

For these reasons, the abrasion-resistant elements of this invention are characterized by a long useful life. These abrasion-resistant lenses or other optical elements can be conveniently cut and edged to any desired shape by conventional means without tending to cause flaking or crazing of the abrasion-resistant coatings on the lenses or elements. The coated elements also display good optical qualities and have the desired light weight and good impact resistance of other prior art organic lens elements. The abrasion-resistant elements are also of relatively inexpensive manufacture.

We claim:

1. An abrasion-resistant optical element comprising a transparent base element of organic material having a directly-adhering, transparent, abrasion-resistant surface coating embodying a polymeric material having ladder-type cross-linking between adjacent molecular chains in the material wherein said polymeric material comprises a vinyl polymer cross-linked with a dialdehyde cross-linking agent.

2. An abrasion-resistant optical element as set forth in claim 1 wherein said vinyl polymer comprises a water-soluble polymer.

3. An abrasion-resistant optical element comprising a transparent organic base element having a directly adhering, transparent, abrasion-resistant surface coating embodying a vinyl polymer selected from the group consisting of at least partially hydrolyzed vinyl acetate polymers and polyvinyl butyral polymers, said vinyl polymer being cross-linked with a dialdehyde cross-linking agent.

4. An abrasion-resistant optical element as set forth in claim 3 wherein said vinyl polymer is selected from the group consisting of polyvinyl alcohol and polyvinyl butyral.

5. An abrasion-resistant optical element as set forth in claim 3 wherein said dialdehyde cross-linking agent is selected from the group consisting of glyoxal, pyruvic aldehyde, 2-hydroxyadipaldehyde and glutaraldehyde.

6. An abrasion-resistant lens comprising a transparent organic lens element having a directly-adhering, transparent, abrasion-resistant surface coating embodying a vinyl material selected from the group consisting of polyvinyl alcohol and polyvinyl butyral and a dialdehyde cross-linking agent selected from the group consisting of glyoxal, pyruvic aldehyde, 2-hydroxyadipaldehyde and glutaraldehyde.

7. An abrasion-resistant lens as set forth in claim 6 wherein said organic lens element is formed of a material selected from the group consisting of cellulose acetate, cellulose acetatebutyrate, cellulose propionate, allyl diglycol carbonate, copolymers of allyl diglycol carbonate, polycarbonate, methyl methacrylate and copolymers of methyl methacrylate, 8. An abrasion-resistant lens as set forth in claim 6 wherein said organic lens element is formed of a material selected from the group consisting of polycarbonate, methyl methacrylate and copolymers of methyl methacrylate and is subcoated with polyvinyl butyral.

9. An abrasion-resistant lens comprising a transparent lens element of allyl diglycol carbonate having a directly-adhering, transparent, abrasion-resistant, thermoset coating embodying polyvinyl alcohol cross-linked with a dialdehyde agent.

10. An abrasion-resistant lens comprising a transparent lens element of polycarbonate having a directly-adhering, transparent, abrasion-resistant, thermoset coating embodying hydrolyzed, water-soluble polyvinyl butyral cross-linked with a dialdehyde agent.

References Cited
UNITED STATES PATENTS

| | | |
|---|---|---|
| 2,320,533 | 6/1943 | Muskat et al. |
| 2,387,831 | 10/1945 | Cogan et al. |
| 2,423,583 | 7/1947 | Cooper _____ 351—177 X |
| 3,221,083 | 11/1965 | Crandon. |
| 3,282,729 | 11/1966 | Richardson et al. |
| 3,294,577 | 12/1966 | Mayer. |

DAVID H. RUBIN, Primary Examiner

U.S. Cl. X.R.

117—72, 76, 138.8, 161; 350—175